(12) United States Patent
Choi et al.

(10) Patent No.: US 12,026,813 B2
(45) Date of Patent: Jul. 2, 2024

(54) APPARATUS AND METHOD FOR PROVIDING DIGITAL TWIN BOOK SHELF

(71) Applicant: WOONGJIN THINKBIG CO., LTD., Paju-si (KR)

(72) Inventors: Samrak Choi, Paju-si (KR); Uiyoung Kim, Paju-si (KR); Sanghyo Lee, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 401 days.

(21) Appl. No.: 17/475,169

(22) Filed: Sep. 14, 2021

(65) Prior Publication Data
US 2022/0084268 A1  Mar. 17, 2022

(30) Foreign Application Priority Data
Sep. 16, 2020  (KR) .......................... 10-2020-0118802

(51) Int. Cl.
| | |
|---|---|
| *G06T 11/60* | (2006.01) |
| *G06T 7/62* | (2017.01) |
| *G06V 20/10* | (2022.01) |
| *G06V 20/62* | (2022.01) |
| *G06V 30/10* | (2022.01) |

(52) U.S. Cl.
CPC ............... *G06T 11/60* (2013.01); *G06T 7/62* (2017.01); *G06V 20/10* (2022.01); *G06V 20/63* (2022.01); *G06V 30/10* (2022.01)

(58) Field of Classification Search
CPC ............................... G06V 20/62; G06V 20/63
See application file for complete search history.

(56) References Cited

U.S. PATENT DOCUMENTS

| | | | | |
|---|---|---|---|---|
| 2003/0043144 A1* | 3/2003 | Pundarika | ............... | G06F 16/34 707/E17.093 |
| 2014/0092241 A1* | 4/2014 | Brinkman | ............ | G06Q 10/087 348/135 |
| 2016/0092471 A1* | 3/2016 | Wu | ....................... | G06F 16/245 705/310 |

FOREIGN PATENT DOCUMENTS

| | | |
|---|---|---|
| KR | 10-2012-0106233 | 9/2012 |
| KR | 10-2017-0050459 A | 5/2017 |
| KR | 10-1821757 B1 | 1/2018 |

OTHER PUBLICATIONS

KR Office Action dated Nov. 23, 2020 as received in Application No. 10-2020-0118802.

* cited by examiner

*Primary Examiner* — Vincent Rudolph
*Assistant Examiner* — Raphael Schwartz
(74) *Attorney, Agent, or Firm* — Maschoff Brennan

(57) ABSTRACT

Disclosed are an apparatus and method for providing a digital twin bookshelf, which can generate a digital twin bookshelf including a virtual bookshelf and book objects by using book information and an image obtained by capturing a real bookshelf. The apparatus captures an image of a real bookshelf in which real books are arranged, detects book recognition information from the real bookshelf image, generates a digital twin bookshelf based on the real bookshelf image and the book information corresponding to the book recognition information, and outputs the generated digital twin bookshelf.

15 Claims, 16 Drawing Sheets

[FIG. 1]
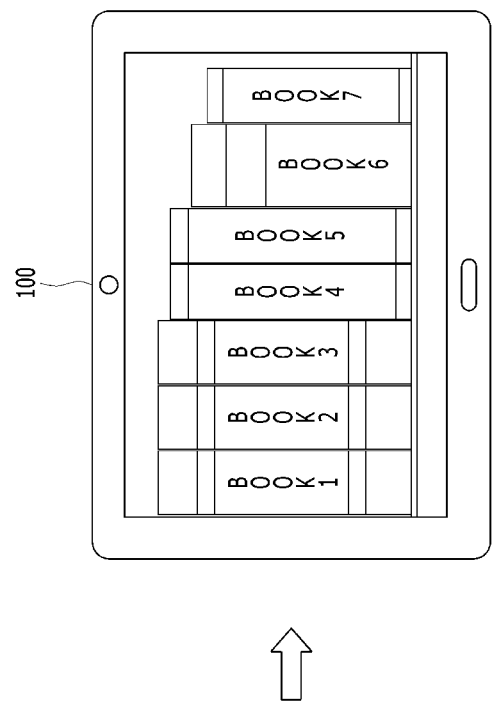
100
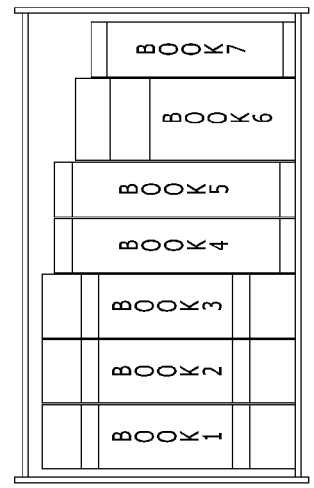

[FIG. 2]
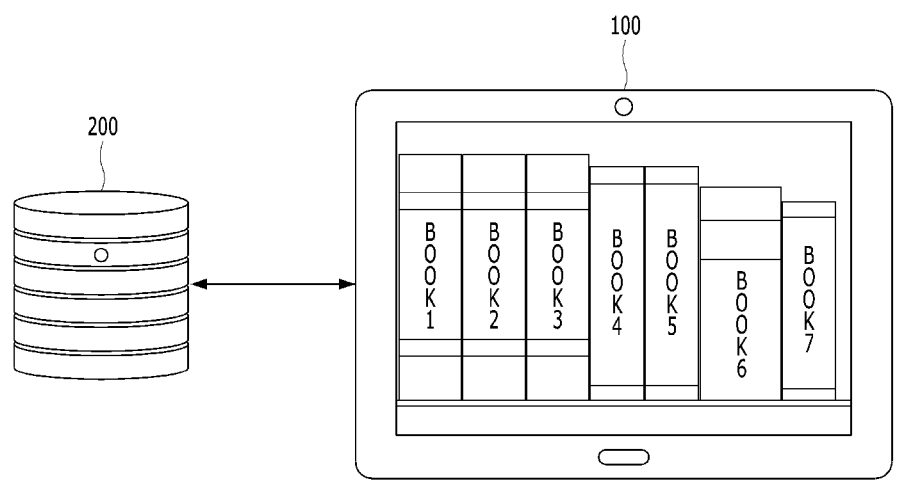

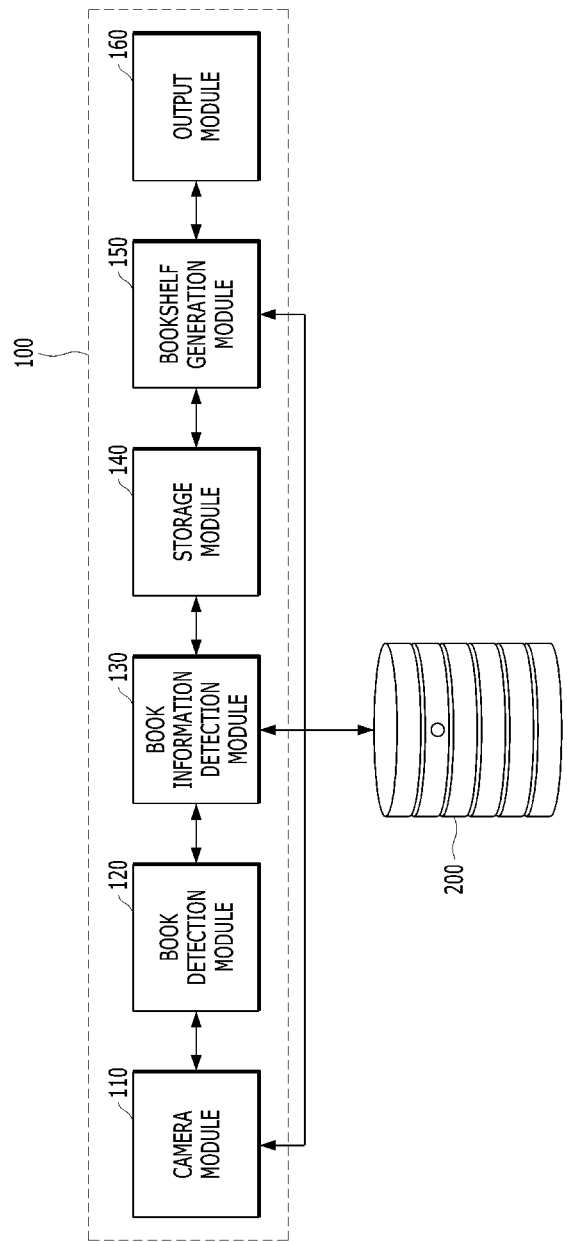
[FIG. 3]

[FIG. 4]
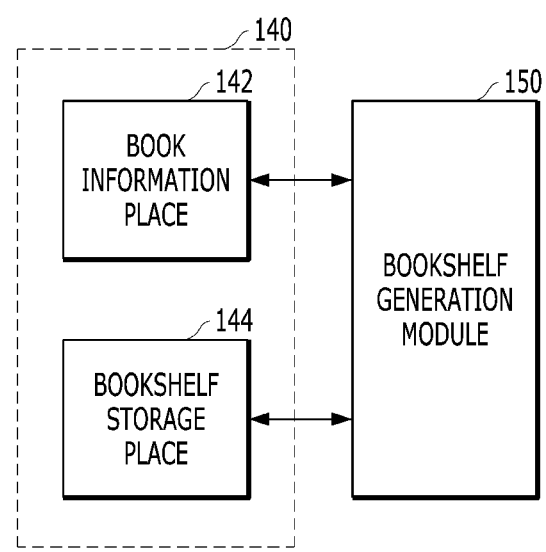

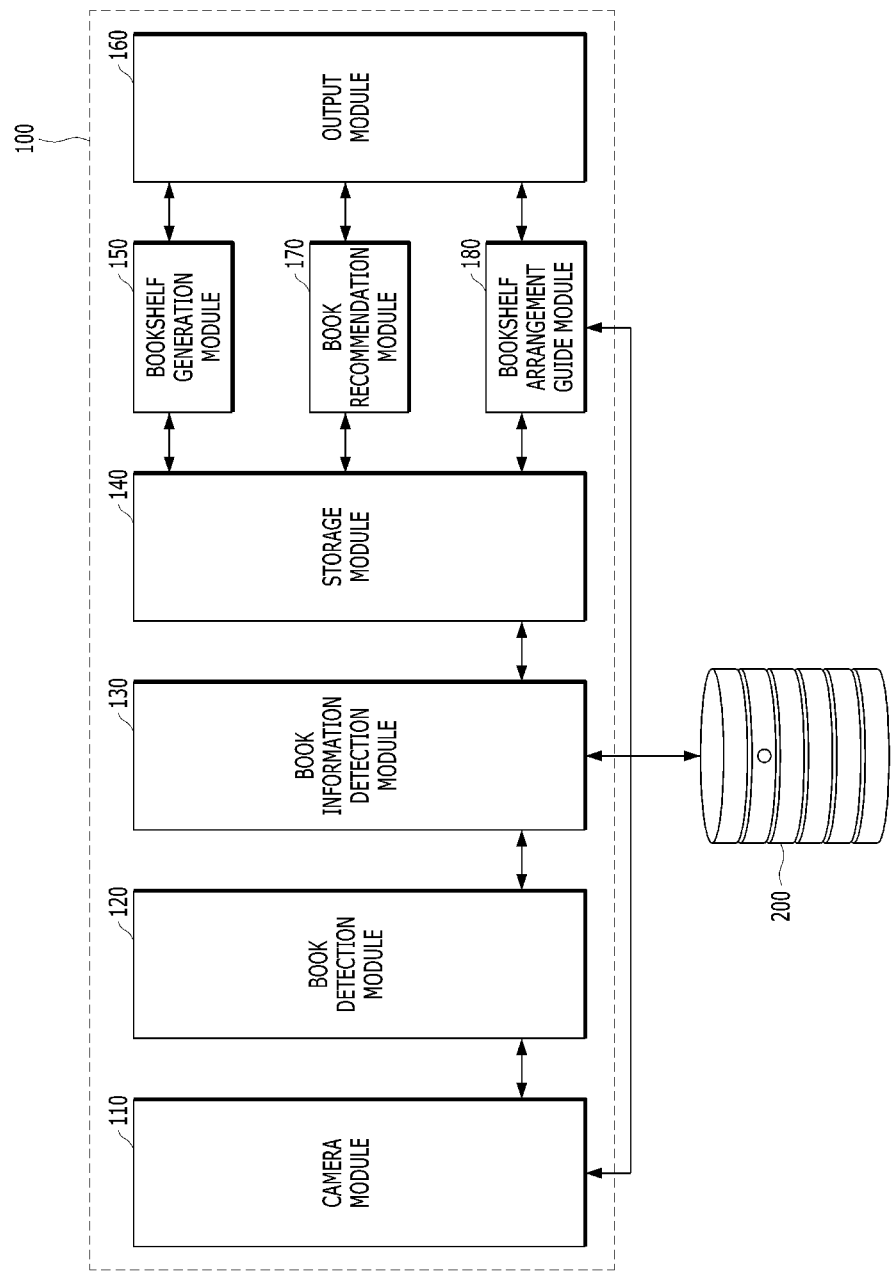

[FIG. 6]
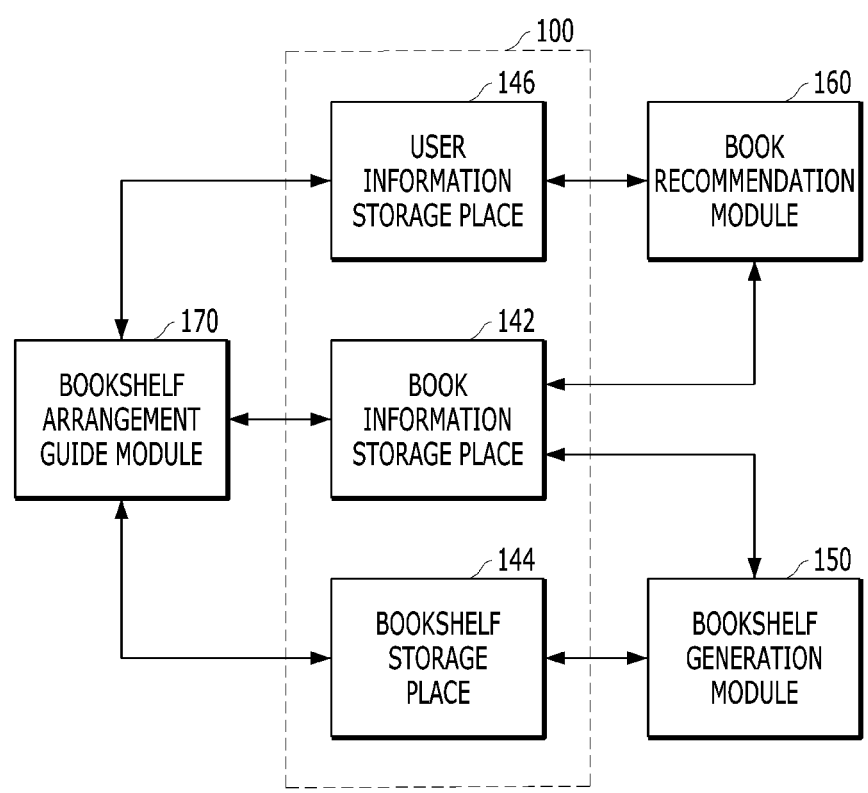

[FIG. 7]
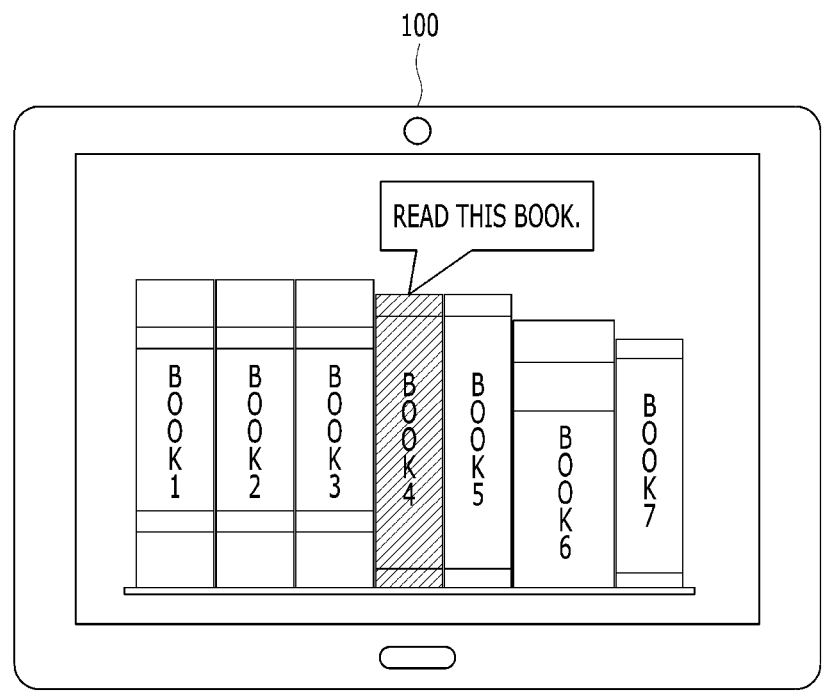

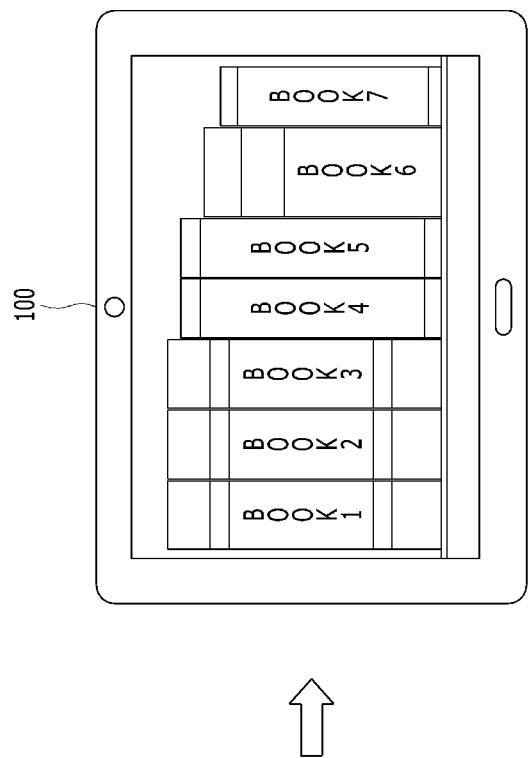
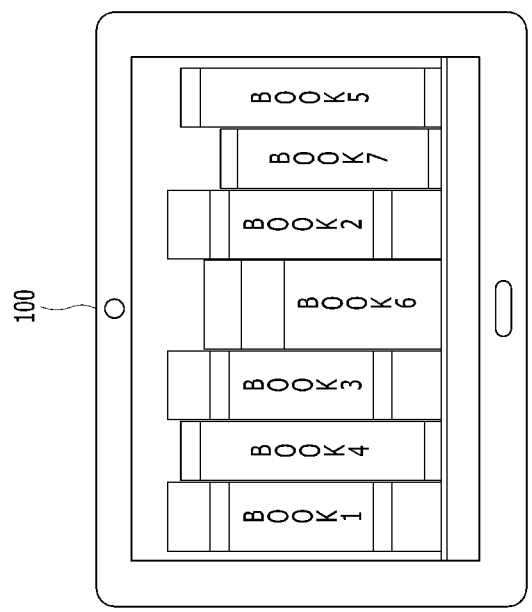
[FIG. 8]

[FIG. 9]
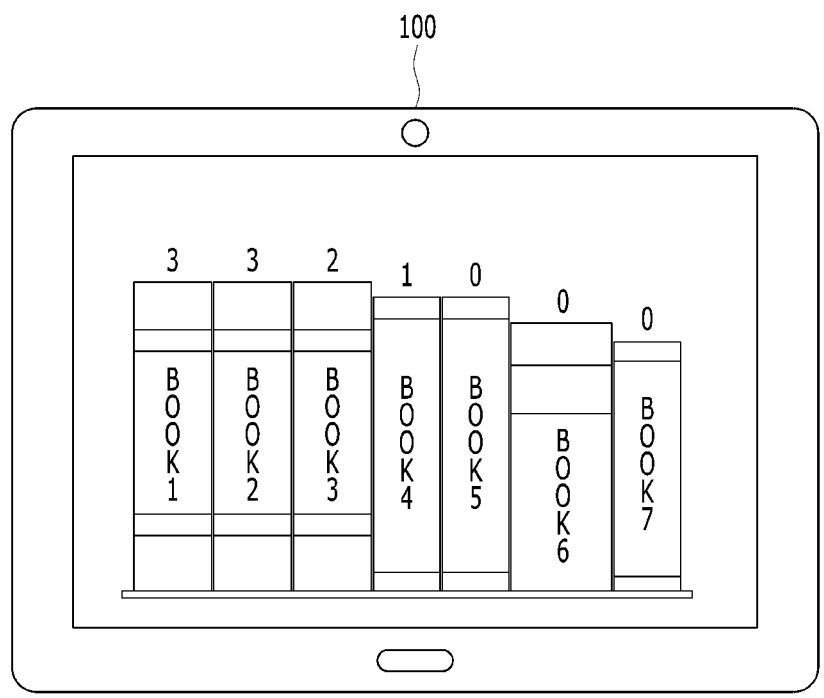

[FIG. 10]
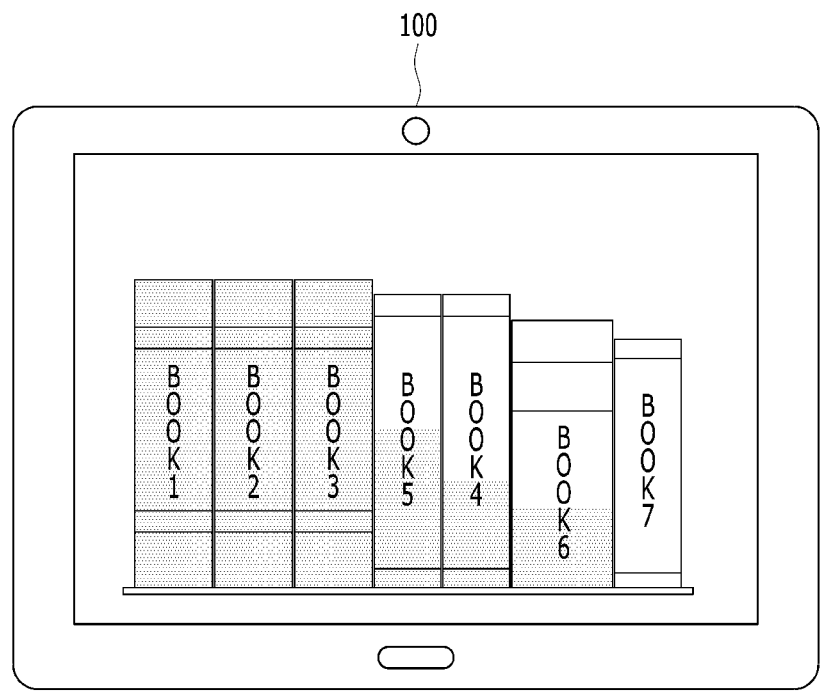

[FIG. 11]
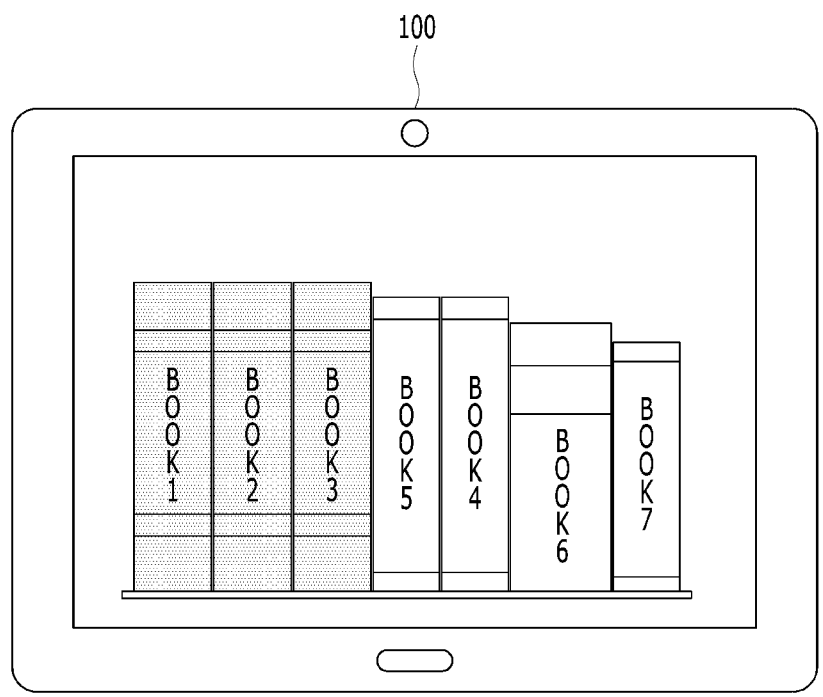

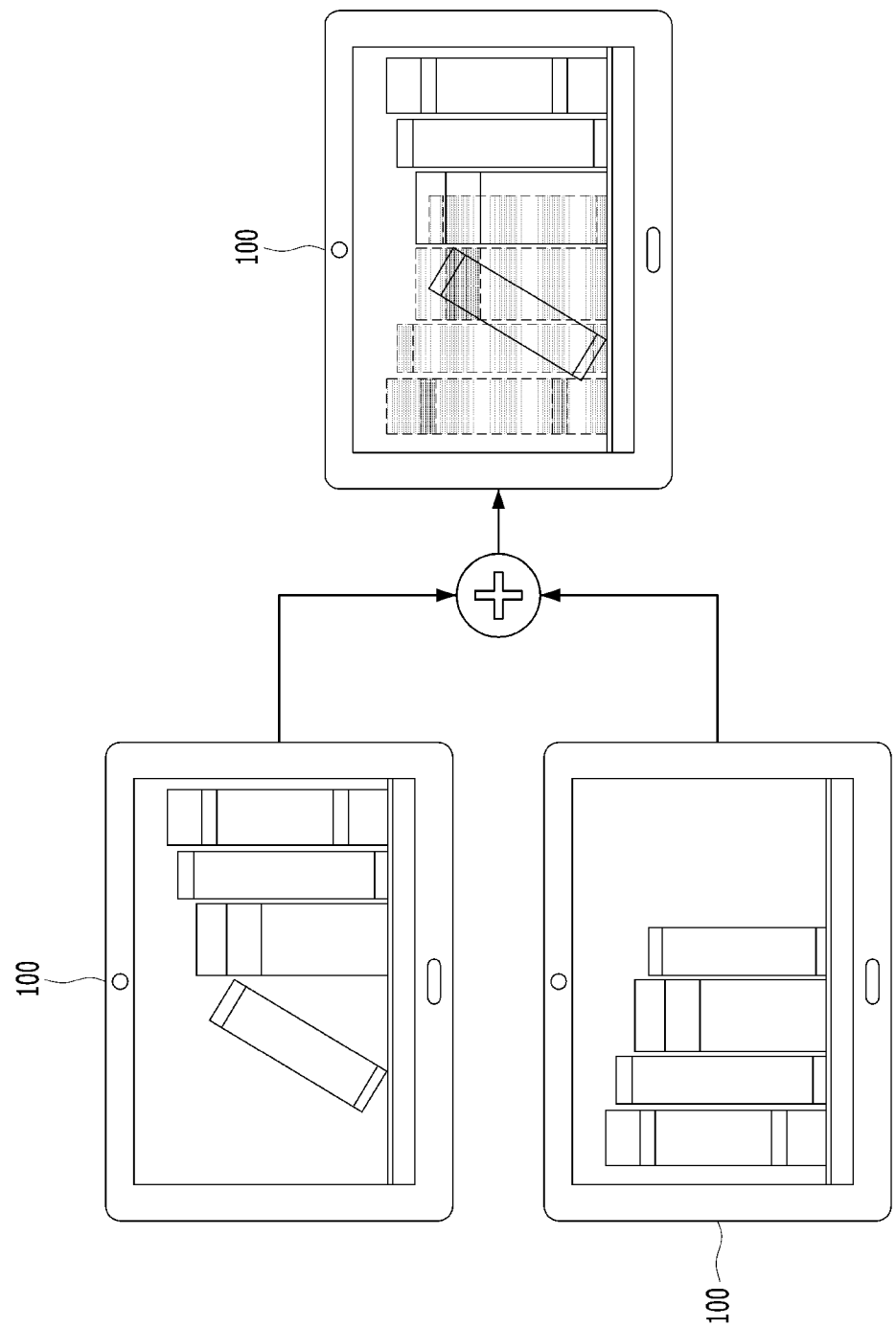
[FIG. 12]

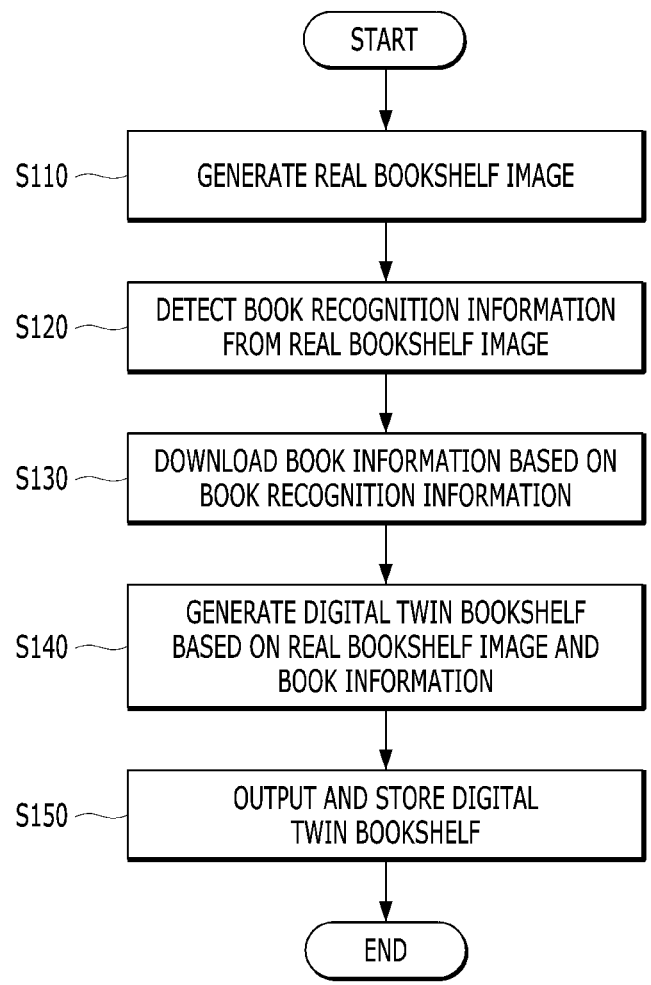

[FIG. 14]
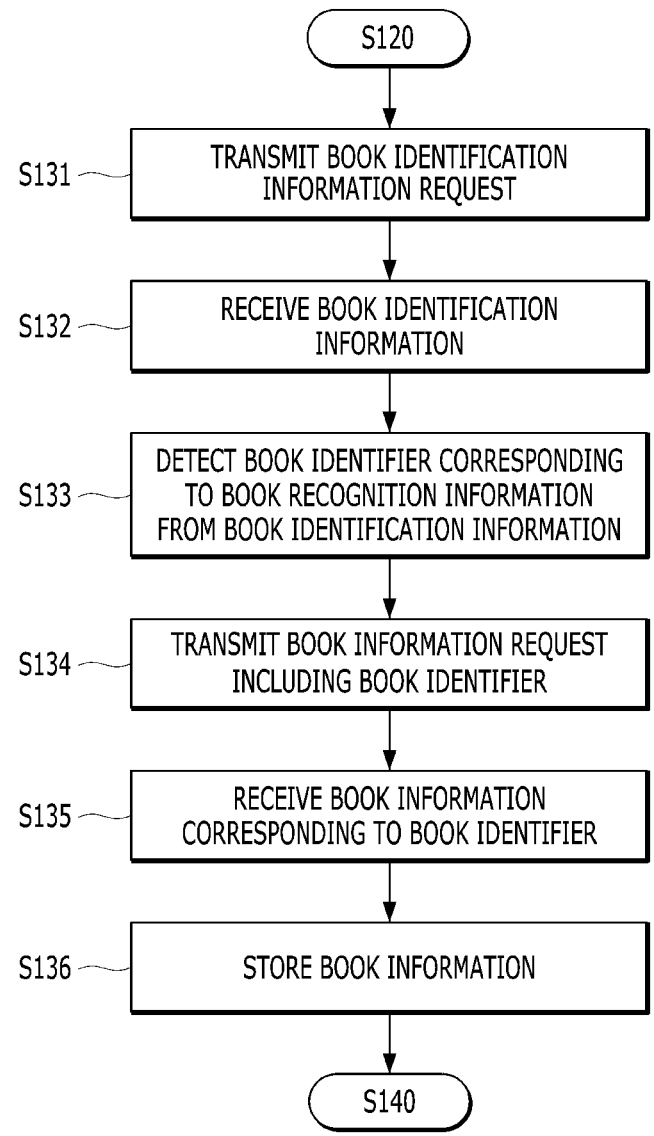

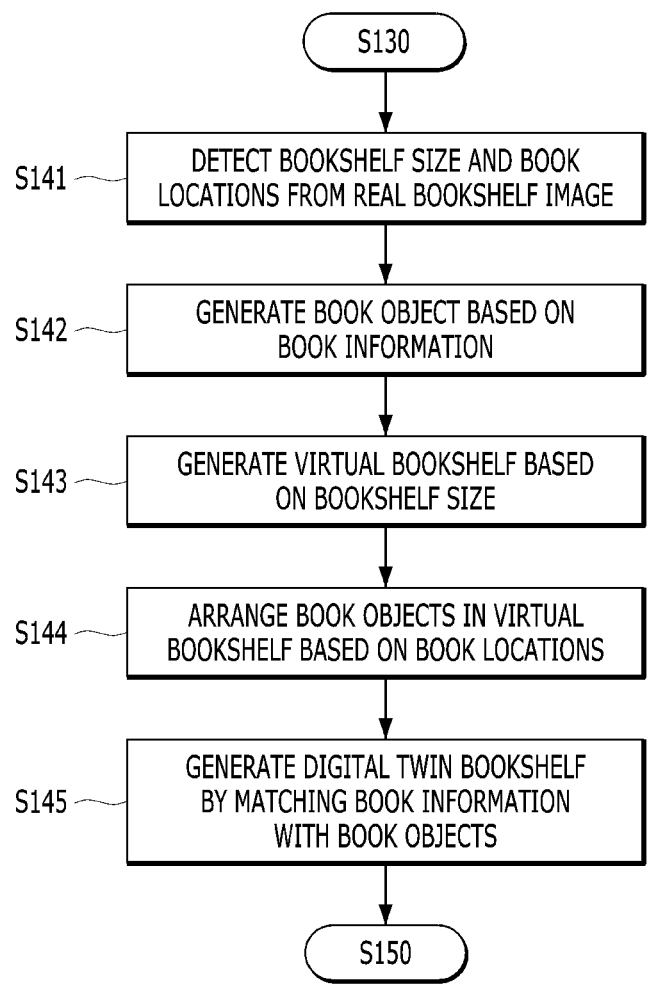
[FIG. 15]

[FIG. 16]
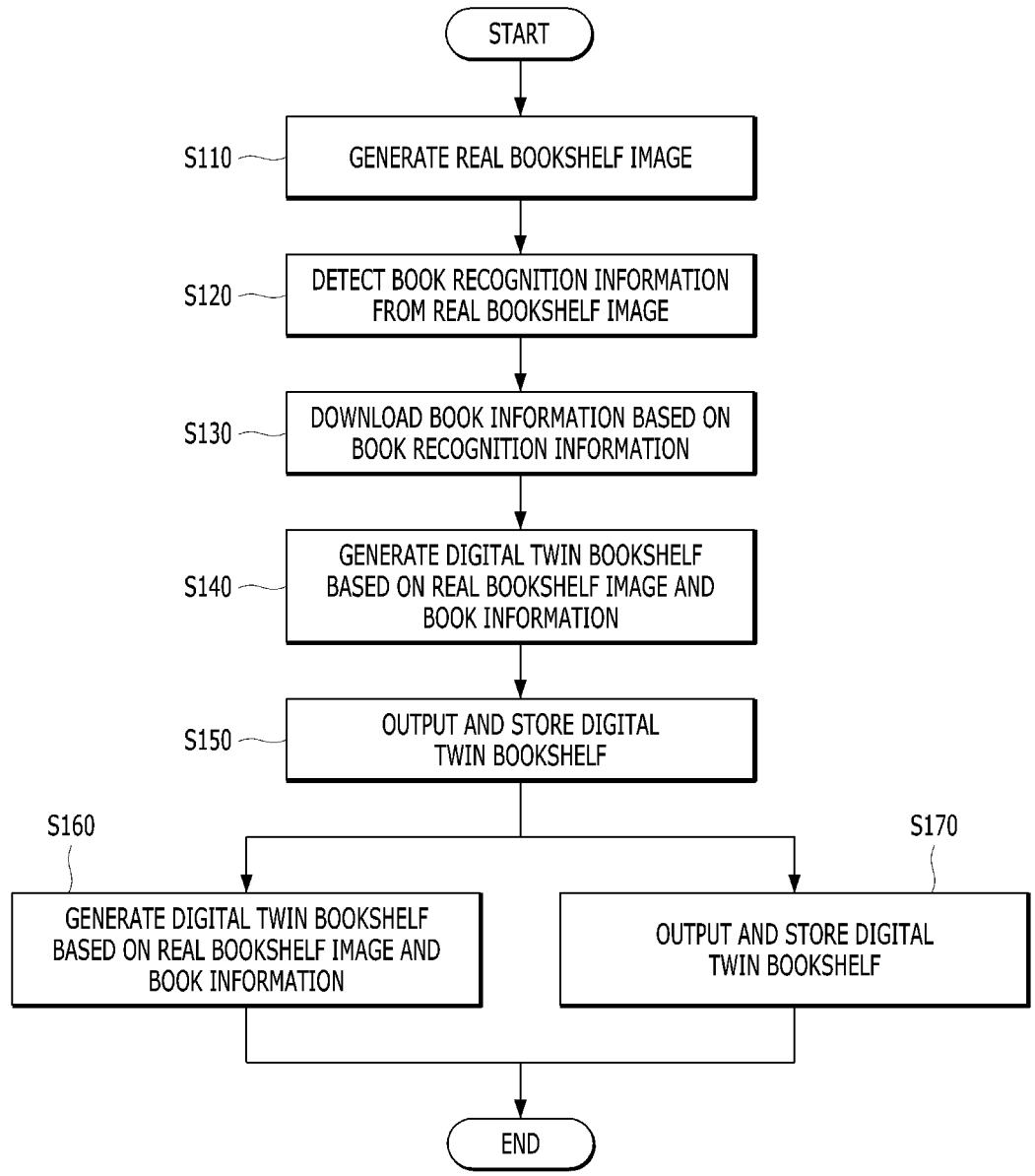

APPARATUS AND METHOD FOR PROVIDING DIGITAL TWIN BOOK SHELF

TECHNICAL FIELD

The present disclosure relates to an apparatus and method for providing a digital twin bookshelf.

BACKGROUND ART

An electronic book is created by converting the contents of a real book into image files and text files, and thus enables a reader to read the contents through a reader terminal. The demand for electronic books is rapidly increasing with the popularization of reader terminals such as an electronic book-dedicated terminal, a smart phone, a laptop computer and a tablet PC.

A user connects to an electronic book providing server for providing electronic books, by using a reader terminal connected to a network. The reader terminal downloads an electronic book such as an image file and text file from the electronic book providing server, and then outputs the electronic book through a display.

Recently, with the increase in use of electronic books, various technologies have been developed to enable a user to conveniently read and manage electronic books.

The contents described in the above background art is to promote understanding of the background of the invention, and may contain matters which are not prior arts already known to a person skilled in the art to which the present technology pertains.

RELATED ART DOCUMENT

Patent Document

Korean Patent Application Laid-Open No. 10-2012-0106233

SUMMARY OF INVENTION

Technical Problem

The present disclosure is proposed to solve the above conventional problem, and an object of the present disclosure is to provide an apparatus and method for providing a digital twin bookshelf, which can generate a digital twin bookshelf including a virtual bookshelf and book objects by using book information and an image obtained by capturing a real bookshelf.

Also, an object of the present disclosure is to provide an apparatus and method for providing a digital twin bookshelf, which can implement a digital twin of a user's bookshelf through an AR (Augmented Reality) technology which has been utilized as means of assistance to increase the use of contents, provide the digital twin as an online and offline medium through which a user performs a simulation of arranging his/her bookshelf or which recommends the optimal arrangement method to the user according to a matter of interest, and apply the simulation or recommendation result to the real world to increase the reading and book utilization experience.

Solution to Problem

To achieve the object, an apparatus for providing a digital twin bookshelf according to an exemplary embodiment of the present disclosure includes a camera configured to generate a real bookshelf image by capturing an image of a real bookshelf in which real books are arranged; a display; a processor; and a memory configured to store instructions which, when executed, cause the processor to perform operations, wherein the processor detects book recognition information from the real bookshelf image generated by the camera, outputs a book information detection request including the book recognition information, detects book recognition information in response to the book information detection request, downloads book information corresponding to the book recognition information, outputs a bookshelf generation request when receiving a storage completion response to a book information storage request including the book information, generates a digital twin bookshelf based on the book information and the real bookshelf image in response to the bookshelf generation request, and outputs a bookshelf output request including the digital twin bookshelf, and wherein the display outputs the digital twin bookshelf in response to the bookshelf output request.

The processor may detect a book spine image including the book spine of each of real books from the real bookshelf image, and detect book recognition information including one or more of a spine letter, a book title, a publisher and a set name, which are printed on the book spine of each of the real books, through a character recognition operation on the book spine image.

The processor may download book identification information including one or more of a book title, a publisher, a set name and a book spine image, which are associated with a book identifier of a real book, detect a book identifier corresponding to the book recognition information from the book identification information, and download book information associated with the book identifier.

The processor may download book information including one or more of a book title, a book size, an electronic book, a field and a publishing date, which are associated with a book identifier.

The memory includes a book information storage place. The memory book information, included in the book information storage request, in the book information storage place in response to the book information storage request.

The processor may detect a bookshelf size and book locations from the real bookshelf image, generate a virtual bookshelf based on the bookshelf size, generate book objects based on book sizes of the book information, and generate a digital twin bookshelf by arranging the book objects in the virtual bookshelf based on the book locations.

The memory stores user information including one or more of the age of a user, the interest field of the user, the number of read times for each book, and a read state for each book; and the processor sets at least one of book objects included in the digital twin bookshelf to a recommended book based on the user information, and output a recommended book output request including the recommend book. The display may output a recommended book on the digital twin bookshelf in response to the recommended book output request.

The processor generates a bookshelf arrangement guide screen on which book objects arranged in the digital twin bookshelf are rearranged, based on the book information and the user information. The processor may output an output request including the bookshelf arrangement guide screen, and the display may output the bookshelf arrangement guide screen to overlap the screen on which the real bookshelf image generated by the camera is outputted.

To achieve the object, a method for providing a digital twin bookshelf according to an exemplary embodiment of the present disclosure includes generating a real bookshelf image by capturing an image of a real bookshelf in which real books are arranged; detecting book recognition information from the real bookshelf image generated in the generating of the real bookshelf image; downloading book information corresponding to the book recognition information detected in the detecting of the book recognition information; generating a digital twin bookshelf based on the book information and the real bookshelf image; and outputting the digital twin bookshelf generated in the generating of the digital twin bookshelf.

The detecting of the book recognition information may include: detecting a book spine image including a book spine of each of the real books from the real bookshelf image; and detecting book recognition information including one or more of a spine letter, a book title, a publisher and a set name, which are printed on each of the book spines of the real books, through a character recognition operation on the book spine image detected in the detecting of the book spine image.

The downloading of the book information may include: downloading book identification information including at least one of a book title, a publisher, a set name and a book spine image, which are associated with a book identifier of each of the real books; detecting a book identifier corresponding to the book recognition information from the book identification information downloaded in the downloading of the book identification information; and downloading book information associated with the book identifier detected in the detecting of the book identifier.

The downloading of the book information may include downloading book information including one or more of a book title, a book size, an electronic book, a field and a publishing date which are associated with a book identifier.

The generating of the digital twin bookshelf may include: detecting a bookshelf size and book locations from the real bookshelf image; generating book objects corresponding to the real books, based on book sizes of the book information; generating a virtual bookshelf based on the bookshelf size; and generating a digital twin bookshelf by arranging the book objects in the virtual bookshelf based on the book locations.

The method may further include: setting at least one of the book objects included in the digital twin bookshelf to a recommended book, based on user information, after the generating of the digital twin bookshelf; and outputting a recommended book, detected in the setting of the at least one of the book objects included in the digital twin bookshelf to the recommended book, onto a screen on which the digital twin bookshelf is outputted. The setting of the at least one of the book objects included in the digital twin bookshelf to the recommended book may include setting a recommended book, based on the user information including one or more of the age of a user, the interest field of the user, the number of read times for each book, and a read state for each book.

The method may further include: generating a bookshelf arrangement guide screen by rearranging the book objects arranged on the digital twin bookshelf, based on the book information and the user information, after the generating of the digital twin bookshelf; and outputting the bookshelf arrangement guide screen generated in the generating of the bookshelf arrangement guide screen. The outputting of the bookshelf arrangement guide screen may include outputting the bookshelf arrangement guide screen to overlap a screen that outputs the real bookshelf image.

Advantageous Effects

According to the present disclosure, the apparatus and method for providing a digital twin bookshelf may generate a digital twin bookshelf including a virtual bookshelf and book objects by using book information and an image obtained by capturing an image of a real bookshelf, and construct a reading environment in which offline and online are connected, such that the a user can easily access to reading, thereby raising the book use rate of the user.

Furthermore, the apparatus and method for providing a digital twin bookshelf may recommend a book based on the age and interest field of a user, the number of read times for each book, the read state for each book (i.e. complete read rate) and the like, and raise the interest level of the user, thereby increasing the book use rate.

Furthermore, the apparatus and method for providing a digital twin bookshelf may recommend a book based on the age and interest field of a user, the number of read times for each book, and the read state for each book (i.e. the complete read rate), and raise the interest level of the user, thereby raising the book use rate.

Furthermore, the apparatus and method for providing a digital twin bookshelf may provide a bookshelf arrangement guide screen on which book object of a digital twin bookshelf are rearranged on the basis of the size, field, level, publishing date and complete read rate of each book, the interest level of a user, and the number of times, thereby enabling the user to easily manage a real bookshelf, and raising the book use rate of the user.

Furthermore, the apparatus and method for providing a digital twin bookshelf may display differences between book arrangement of a real bookshelf and book arrangement of a digital twin bookshelf, such that a user can easily arrange the real bookshelf.

BRIEF DESCRIPTION OF DRAWINGS

FIGS. 1 and 2 are diagrams for describing an apparatus for providing a digital twin bookshelf in accordance with an embodiment of the present disclosure.

FIG. 3 is a diagram for describing a configuration of the apparatus for providing a digital twin bookshelf in accordance with the embodiment of the present disclosure.

FIG. 4 is a diagram for describing a storage module of FIG. 3.

FIG. 5 is a diagram for describing a modified example of the apparatus for providing a digital twin bookshelf in accordance with the embodiment of the present disclosure.

FIG. 6 is a diagram for describing a storage module of FIG. 5.

FIG. 7 is a diagram for describing an output module of FIG. 5.

FIGS. 8 to 12 are diagrams for describing a bookshelf arrangement guide module of FIG. 5.

FIG. 13 is a flowchart for describing a method for providing a digital twin bookshelf in accordance with an embodiment of the present disclosure.

FIG. 14 is a flowchart for describing a book information download step of FIG. 13.

FIG. 15 is a flowchart for describing a digital twin bookshelf generation step of FIG. 13.

FIG. 16 is a flowchart for describing a modified example of the method for providing a digital twin bookshelf in accordance with the embodiment of the present disclosure.

DESCRIPTION OF EMBODIMENTS

Hereafter, exemplary embodiments will be described with reference to the accompanying drawings, in order to describe the technical idea of the present disclosure in detail such that a person skilled in the art to which the present disclosure pertains can easily carry out the technique idea of the present disclosure. First, it should be noted that the same components in the drawings are represented by like reference numerals even though the same components are illustrated in different drawings. Moreover, in describing the present disclosure, detailed descriptions for publicly known functions or configurations related to the present disclosure will be ruled out in order not to unnecessarily obscure the subject matters of the present disclosure.

Those skilled in the art will appreciate that various exemplary blocks, apparatuses, modules or operations described in connection with the configurations disclosed in the present specification may be implemented by electronic hardware, computer software, or a combination thereof. These blocks, apparatuses, modules or operations may be implemented or performed using a processor. The processor may be implemented by a combination of computing devices such as, a digital signal processor (DSP), an application-specific integrated circuit (ASIC) or an application-specific standard product (ASSP), a field-programmable gate array (FPGA) or other programmable logic device, an individual gate or transistor logic, an individual hardware component or any combination thereof designed to produce a configuration as disclosed in the present specification.

The processor may perform certain operation by executing a computer software stored in a memory device. The memory device may includes at least one of a random access memory (RAM), a read-only memory (ROM), a non-volatile RAM such as a flash RAM, an erasable and programmable ROM (EPROM), an electrically erasable and programmable ROM (EEPROM), a register, a hard disk, a removable disk, a CD-ROM, or any other form of storage medium known in the art. The memory device may be coupled with the processor, and the processor may read information from the memory device and write the information to the memory device. Alternatively, the memory device may be integral with the processor. Referring to FIG. 1, an apparatus 100 for providing a digital twin bookshelf (hereafter, referred to as a digital twin bookshelf providing apparatus 100) in accordance with an embodiment of the present disclosure interworks with a database server 200 which stores book information to generate a digital twin bookshelf. The digital twin bookshelf providing apparatus 100 detects book recognition information from a real bookshelf image obtained by capturing an image of a real bookshelf in which real books are arranged, downloads book information corresponding to the book recognition information from the database server 200, and stores the downloaded book information therein. The book recognition information may include one or more pieces of information, such as a book spine image, spine letters, book title, publisher and set name, through which a book can be recognized.

Referring to FIG. 2, the digital twin bookshelf providing apparatus 100 generates a digital twin bookshelf corresponding to the real bookshelf by using the real bookshelf image and the book information. The digital twin bookshelf providing apparatus 100 generates a digital twin bookshelf which is a virtual bookshelf corresponding to a real bookshelf, and generates a digital twin bookshelf using an augmented reality or virtual reality technology. The digital twin bookshelf providing apparatus 100 provides various services such as book recommendation and bookshelf arrangement guide by using the digital twin bookshelf.

Referring to FIG. 3, the digital twin bookshelf providing apparatus 100 is configured as a portable terminal such as a smart phone or tablet PC, and includes a camera 110, a book detection module 120, a book information detection module 130, a storage module 140, a bookshelf generation module 150 and an output module 160.

As described in advance, the operations or configuration of the book detection module 120, the book information detection module 130 and the bookshelf generation module 150 could be understood as operations or configuration of at least one of processor. The processor may perform the operations by executing instructions in a computer program stored in a memory device.

The camera 110 captures an image of a real bookshelf, and transmits the captured image to the book detection module 120. The camera 110 generates a real bookshelf image by capturing an image of a real bookshelf in which real books are arranged, and transmits the generated real bookshelf image to the book detection module 120.

The book detection module 120 detects book recognition information by using the real bookshelf image of the camera 110. The book detection module 120 detects book spine images of the real books arranged in the real bookshelf from the real bookshelf image through an image processing operation. The book detection module 120 may further detect spine letters through an image processing operation on the book spine images. The book detection module 120 may further detect book titles, publishers and set names through a character recognition operation on the book spine images. At this time, the book recognition information detected by the book detection module 120 may be configured as one of an image and a text.

When the book recognition information is completely detected, the book detection module 120 generates a book information detection request including the book recognition information. The book detection module 120 transmits the generated book information detection request to the book information detection module 130.

The book information detection module 130 detects the book information from the database server 200 in response to the book information detection request of the book detection module 120. The book information detection module 130 detects the book recognition information from the book information detection request of the book detection module 120.

The book information detection module 130 generates a book identification information request, transmits the generated book identification information request to the database server 200, and receives book identification information as a response to the book identification information request. At this time, the book identification information includes a book title, a publisher, a set name, a book spine image and the like, which are associated with a book identifier.

The book information detection module 130 detects a book identifier, corresponding to the book recognition information, from the book identification information. The book information detection module 130 detects the book identifier of book identification information whose similarity to the book title, the publisher, the set name or the book spine image, included in the book recognition information, is equal to or more than a reference value.

The book information detection module 130 transmits a book information request including the detected book identifier to the database server 200. The book information detection module 130 receives book information associated with the book identifier as a response to the book information request. At this time, the book information detection module 130 receives the book information from the database server 200, the book information including the book identifier, a book title, a book size, an electronic book, a field, a publishing date and the like. The book size may indicate the height and width of the book spine, and the electronic book may be data obtained by processing a real book in the form of an image, video or text which can be outputted onto a portable terminal.

The book information detection module 130 transmits a book information storage request, including the book information received from the database server 200, to the storage module 140. When receiving a storage completion response from the storage module 140, the book information detection module 130 transmits a bookshelf generation request to the bookshelf generation module 150.

The storage module 140 stores the book information in response to the book information storage request of the book information detection module 130. For example, the storage module 140 may be implemented as a memory device. The storage module 140 stores the book information included in the book information storage request and stores the book identifier, the book size, the electronic book, the field, the publishing date and the like included in the book information. The storage module 140 stores the detected book identifier, book title, book size, electronic book, field and publishing date in association with one another. When the book information is completely stored, the storage module 140 transmits a storage completion response to the book information detection module 130.

The bookshelf generation module 150 generates a digital twin bookshelf using the book information stored in the storage module 140 in response to the bookshelf generation request of the book information detection module 130. The bookshelf generation module 150 generates the digital twin bookshelf using the real bookshelf image generated by the camera 110 and the book information stored in the storage module 140.

The bookshelf generation module 150 detects the bookshelf size and the book locations of the respective books from the real bookshelf image. The bookshelf generation module 150 detects the bookshelf size and the book locations of the real books arranged in the bookshelf by analyzing the real bookshelf image. At this time, each of the book locations may indicate a plane coordinate (2D coordinate) on the real bookshelf image, for example. The bookshelf generation module 150 may further detect a book area indicating an area occupied by the book spine of each of the books in the real bookshelf image, in addition to the book location.

The bookshelf generation module 150 generates a book object using the book information. The bookshelf generation module 150 generates the book object by using the book size of the book information. At this time, the bookshelf generation module 150 generates the book object into which the book size including a book spine size, a cover size and a thickness is reflected.

The bookshelf generation module 150 generates a virtual bookshelf by using the bookshelf size detected from the real bookshelf image, and generates a digital twin bookshelf by arranging the book objects in the virtual bookshelf based on the book locations detected from the real bookshelf image (see FIG. 1). At this time, the bookshelf generation module 150 may generate a digital twin bookshelf having a size corresponding to the bookshelf size and the book size, or generate a digital twin bookshelf having a size adjusted to the ratio of the bookshelf size to the book size. FIG. 1 illustrates the digital twin bookshelf configured in a 2D manner in order to easily describe the embodiment of the present disclosure, but the digital twin bookshelf may be actually configured in a 3D manner using an augmented reality or virtual reality technology. When a portable terminal has low performance, the digital twin bookshelf may be configured in a 2D manner.

The bookshelf generation module 150 matches the book objects arranged in the digital twin bookshelf with the book information. At this time, the bookshelf generation module 150 matches each of the book objects with the book identifier, the book title, the electronic book, the field and the publishing date. The bookshelf generation module 150 may selectively match some of the book title, the book size, the electronic book, the field and the publishing date with the book object. The bookshelf generation module 150 may match the book information with the book objects during the process of generating the book objects.

In the present embodiment, it has been described that the bookshelf generation module 150 generates the digital twin bookshelf in which electronic books and book objects are matched one to one. However, depending on whether a user owns electronic books, the bookshelf generation module 150 may generate a digital twin bookshelf in which no electronic books are matched with some book objects.

The bookshelf generation module 150 divides the book objects arranged in the digital twin bookshelf into first book objects for which the user has electronic books and second book objects for which the user has no electronic books.

When the digital twin bookshelf is completely generated, the bookshelf generation module 150 transmits a bookshelf output request including the digital twin bookshelf to the output module 160. The output module 160 outputs the digital twin bookshelf on a screen in response to the bookshelf output request of the bookshelf generation module 150.

The output module 160 partitively displays the first book objects for which the user has electronic books and the second book objects for which the user has no electronic books. For example, the output module may be implemented as a display device. The output module 160 may partitively display book objects corresponding to books which the user has read and book objects corresponding to books which the user has not read, when outputting the digital twin bookshelf.

For example, the output module 160 may set the transparency of the first book objects to a low value, and set the transparency of the second book objects to a high value, such that the first book objects for which the user has the electronic books can be displayed more clearly. At this time, the output module 160 may set the transparency of the first book objects corresponding to the books which the user has read, among the first book objects, to a higher value than that of the first book objects corresponding to the books which the user has not read, such that the first book objects corresponding to the books which the user has not read are displayed more clearly.

For another example, the output module 160 may display the states of the second book objects, for which the user has no electronic books, in the form of texts or images, and display information on the first book objects, corresponding to the books which the user has read, in the form of texts or images.

For another example, the output module 160 may output a text or image which suggests the purchase of an electronic book corresponding to each of the second book objects, such that the text or image is displayed on the screen so as to overlap the second book object. At this time, the output module 160 may output a text or image that suggests the purchase of an electronic book only for the second book object selected by the user, such that the text or image is displayed to overlap the second book object.

When the digital twin bookshelf is completely generated, the bookshelf generation module 150 transmits a bookshelf storage request including the digital twin bookshelf to the storage module 140. The storage module 140 stores the digital twin bookshelf in response to the bookshelf storage request of the bookshelf generation module 150.

For this operation, the storage module 140 may include a book information storage place 142 configured to store book information and a bookshelf storage place 144 configured to store the digital twin bookshelf, as illustrated in FIG. 4.

Referring to FIG. 5, the digital twin bookshelf providing apparatus 100 may further include a book recommendation module 170 configured to provide a book recommendation service using the digital twin bookshelf and a bookshelf arrangement guide module 180 configured to provide a bookshelf arrangement guide service. At this time, referring to FIG. 6, the storage module 140 further includes a user information storage place 146 configured to store user information therein, the user information including the age and interest field of a user, the number of times that the user has read each of the books (hereafter, referred to as the number of read times for each book), and the read state for each book (i.e. the complete read rate), in order to provide a book recommendation service and a bookshelf arrangement guide service.

The book recommendation module 170 sets at least one of the book objects included in the digital twin bookshelf to a recommended book, based on the user information stored in the storage module 140. The book recommendation module 170 transmits a user information detection request to the user information storage place 146, and receives the user information as a response to the user information detection request. The book recommendation module 170 sets at least one of the book objects included in the digital twin bookshelf to a recommended book, based on the user information. The book recommendation module 170 transmits a recommended book output request including the recommended book to the output module 160.

The output module 160 outputs the recommended book on the digital twin bookshelf in response to the recommended book output request of the book recommendation module 170. At this time, the output module 160 may output the recommended book through a recommended book take-out effect, a recommended book emphasis effect, a recommended book recommendation message or the like. For example, referring to FIG. 7, the output module 160 emphasizes and displays the outline of a book object corresponding to the recommended book, among the book objects arranged in the digital twin bookshelf, and displays the book recommendation message on the screen.

The bookshelf arrangement guide module 180 generates a bookshelf arrangement guide screen for guiding the arrangement of the real bookshelf. The bookshelf arrangement guide module 180 generates a bookshelf arrangement guide screen on which the book objects are arranged on the basis of one of the size, field, level, publishing date and complete read rate of each of the books. The bookshelf arrangement guide module 180 may generate a bookshelf arrangement guide screen on which the book objects are arranged on the basis of the interest level of the user and the number of read times.

For example, referring to FIG. 8, when books BOOK 1, BOOK 4, BOOK 3, BOOK 6, BOOK 2, BOOK 7 and BOOK 5 are sequentially arranged in a real bookshelf image, the bookshelf arrangement guide module 180 generates a bookshelf arrangement guide screen on which the books BOOK 1 to BOOK 7 are sequentially arranged in the digital twin bookshelf on the basis of the sizes of the books.

The bookshelf arrangement guide module 180 may generate a bookshelf arrangement guide screen where the complete read rate and the number of read times are marked on each of the book objects, when generating the bookshelf arrangement guide screen on the basis of the complete read rate and the number of read times.

For example, referring to FIG. 9, the bookshelf arrangement guide module 180 generates a bookshelf arrangement guide screen on which the book objects are arranged on the basis of the number of read times, and displays each of the book objects included in the bookshelf arrangement guide screen and associated with the number of times that the user has read the corresponding book.

For another example, referring to FIG. 10, the bookshelf arrangement guide module 180 generates a bookshelf arrangement guide screen on which the book objects are arranged on the basis of the complete read rate, and displays, in the form of a graph, the complete read rate of the user for each of the book objects included in the bookshelf arrangement guide screen.

For another example, referring to FIG. 11, the bookshelf arrangement guide module 180 generates a bookshelf arrangement guide screen on which the book objects are arranged on the basis of information on which the user has read the books, and partitively displays the book objects, included in the bookshelf arrangement guide screen, as books which the user has read and books which the user has not read. At this time, when the user has not completely read a book, the bookshelf arrangement guide module 180 may display the book as the book which the user has not read.

In the present embodiment, it has been described that the bookshelf arrangement guide module 180 rearranges the book objects on the basis of one criterion. However, the present disclosure is not limited thereto, but the bookshelf arrangement guide module 180 may rearrange the book objects on the basis of two or more criteria.

The bookshelf arrangement guide module 180 transmits an output request including the bookshelf arrangement guide screen to the output module 160, and the output module 160 outputs the bookshelf arrangement guide screen in response to the output request of the bookshelf arrangement guide module 180.

The output module 160 may set the transparency of the bookshelf arrangement guide screen, and then output the bookshelf arrangement guide screen to overlap the real bookshelf image. For example, referring to FIG. 12, the output module 160 outputs the bookshelf arrangement guide screen, whose transparency is set to 50% after the color thereof has been converted into gray, onto the real bookshelf image such that the bookshelf arrangement guide screen overlaps the real bookshelf image.

When outputting the bookshelf arrangement guide screen to overlap the real bookshelf image, the output module 160 may separately display different portions.

As such, the digital twin bookshelf providing apparatus 100 may output the bookshelf arrangement guide screen to overlap the real bookshelf image, such that the user can check the state in which the real bookshelf is arranged.

Hereafter, a method for providing a digital twin bookshelf in accordance with an embodiment of the present disclosure will be described in detail with reference to the accompanying drawings.

Referring to FIG. 13, the digital twin bookshelf providing apparatus 100 generates a real bookshelf image by capturing an image of a real bookshelf, in step 110. The digital twin bookshelf providing apparatus 100 generates a real bookshelf image by capturing an image of a real bookshelf in which a plurality of real books are arranged.

The digital twin bookshelf providing apparatus 100 detects book recognition information from the real bookshelf image in step S120. The digital twin bookshelf providing apparatus 100 detects book spine images of the real books arranged in the real bookshelf from the real bookshelf image through an image processing operation. The digital twin bookshelf providing apparatus 100 may further detect the spine letters of the real books by processing the book spine images. The digital twin bookshelf providing apparatus 100 may further detect the book titles, the publishers and the set names of the real books through a character recognition operation on the book spine images. At this time, the digital twin bookshelf providing apparatus 100 may detect book recognition information configured as one of an image and a text.

The digital twin bookshelf providing apparatus 100 downloads book information based on the bookshelf recognition information, in step S130.

For this operation, referring to FIG. 14, the digital twin bookshelf providing apparatus 100 transmits a book identification information request to the database server 200 in step S131, and receives book identifier information from the database server 200 as a response to the book identification information request, in step S132. At this time, the digital twin bookshelf providing apparatus 100 receives the book identification information including a book title, a publisher, a set name and a book spine image which are associated with a book identifier.

The digital twin bookshelf providing apparatus 100 detects a book identifier corresponding to the book recognition information from the book identification information in step S133. The digital twin bookshelf providing apparatus 100 detects the book identifier of the book identification information whose similarity to the book title, the publisher, the set name or the book spine image, included in the book recognition information, is equal to or more than a reference value.

The digital twin bookshelf providing apparatus 100 transmits a book information request including the book identifier to the database server 200 in step S134, and receives book information associated with the book identifier, as a response to the book information request, from the database server 200 in step S135. The digital twin bookshelf providing apparatus 100 receives the book information including the book identifier, the book title, the book size, the electronic book, the field, the publishing date and the like. The book size may indicate the height and width of the book spine, and the electronic book may be data obtained by processing a real book in the form of an image, video or text which can be outputted onto a portable terminal.

The digital twin bookshelf providing apparatus 100 stores the book information, received in step S135, in an internal storage place thereof in step S136. The digital twin bookshelf providing apparatus 100 stores the book identifier, the book size, the electronic book, the field, the publishing date and the like, which are included in the book information, in association with one another.

The digital twin bookshelf providing apparatus 100 generates a digital twin bookshelf using the real bookshelf image and the book information, in step S140.

For this operation, referring to FIG. 15, the digital twin bookshelf providing apparatus 100 detects the bookshelf size and the book locations of the respective books from the real bookshelf image in step S141. The digital twin bookshelf providing apparatus 100 detects the bookshelf size and the book locations of real books arranged in the bookshelf by analyzing the real bookshelf image. At this time, each of the book locations may indicate a plane coordinate (2D coordinate) on the real bookshelf image, for example. The digital twin bookshelf providing apparatus 100 may further detect a book area indicating an area occupied by the book spine of the book in the real bookshelf image, in addition to the book location.

The digital twin bookshelf providing apparatus 100 generates book objects by using the book information, in step S142. The digital twin bookshelf providing apparatus 100 generates the book objects by using the book sizes of the book information. At this time, the digital twin bookshelf providing apparatus 100 generates each of the book objects into which the book size including a book spine size, a cover size and a thickness is reflected.

The digital twin bookshelf providing apparatus 100 generates a virtual bookshelf on the basis of the bookshelf size detected in step S141, in step S143. Then, the digital twin bookshelf providing apparatus 100 arranges the book objects in the virtual bookshelf on the basis of the book locations detected in step S141, in step S144. In step S143, the digital twin bookshelf providing apparatus 100 may generate a virtual bookshelf having a size corresponding to the bookshelf size and the book size, or generate a virtual bookshelf having a size adjusted to the ratio of the bookshelf size to the book size.

The digital twin bookshelf providing apparatus 100 generates a digital twin bookshelf by matching the book objects arranged in the virtual bookshelf with the book information, in step S145. The digital twin bookshelf providing apparatus 100 matches the book identifier, the book title, the book size, the electronic book, the field, the publishing date and the like with each of the book objects. The digital twin bookshelf providing apparatus 100 may selectively match some of the book title, the book size, the electronic book, the field and the publishing date with each of the book objects. The digital twin bookshelf providing apparatus 100 may match the book information with the book objects, in step S142. In this case, step S145 is omitted, and the digital twin bookshelf is generated in step S144.

The digital twin bookshelf providing apparatus 100 outputs and stores the digital twin bookshelf generated in step S140, in step S150. At this time, the digital twin bookshelf providing apparatus 100 may partitively display book objects corresponding to books which the user has read and book objects corresponding to books which the user has not read, when outputting the digital twin bookshelf.

The digital twin bookshelf providing apparatus 100 partitively displays first book objects for which the user has electronic books and second book objects for which the user has no electronic books. For example, the output module 160 may partitively display the book objects corresponding to books which the user has read and the book objects corresponding to books which the user has not read, when outputting the digital twin bookshelf.

For example, the output module 160 may set the transparency of the first book objects to a low value, and set the transparency of the second book objects to a high value, such that the first book objects for which the user has the electronic books can be displayed more clearly. At this time, the output module 160 may set the transparency of the first book objects corresponding to the books which the user has read, among the first book objects, to a higher value than that of the first book objects corresponding to the books which the user has not read, such that the first book objects corresponding to the books which the user has not read are displayed more clearly.

For another example, the output module 160 may display the states of the second book objects, for which the user has no electronic books, in the form of texts or images, and display information on the first book objects, corresponding to the books which the user has read, in the form of texts or images.

For another example, the output module 160 may output a text or image which suggests the purchase of the electronic book corresponding to each of the second book objects, such that the text or image is displayed on the screen so as to overlap the second book object. At this time, the output module 160 may output a text or image that suggests the purchase of an electronic book only for the second book object selected by the user, such that the text or image is displayed to overlap the second book object.

Referring to FIG. 16, the method for providing a digital twin bookshelf in accordance with the embodiment of the present disclosure may further include a book recommendation step S160 of recommending at least one of the plurality of book objects arranged in the digital twin bookshelf based on user information, and a bookshelf arrangement guide step S170 based on the real bookshelf image and the digital twin bookshelf.

In the book recommendation step S160, the digital twin bookshelf providing apparatus 100 detects at least one of the book objects, included in the digital twin bookshelf, as a recommended book based on the user information including the age and interest field of the user, the number of read times for each book, the read state for each book (i.e. complete read rate) and the like, and outputs the screen where the recommended book is displayed on the digital twin bookshelf. The digital twin bookshelf providing apparatus 100 outputs the recommended book through a recommended book take-out effect, a recommended book emphasis effect, a recommended book recommendation message or the like.

In the bookshelf arrangement guide step S170, the digital twin bookshelf providing apparatus 100 generates a bookshelf arrangement guide screen for guiding the arrangement of the real bookshelf. The digital twin bookshelf providing apparatus 100 generates a bookshelf arrangement guide screen on which the book objects are arranged on the basis of one of the size, field, level, publishing date and complete read rate of each of the books. The digital twin bookshelf providing apparatus 100 may generate a bookshelf arrangement guide screen on which the book objects are arranged on the basis of the interest degree of the user and the number of read times. At this time, when generating the bookshelf arrangement guide screen based on the complete read rate and the number of read times, the digital twin bookshelf providing apparatus 100 may generate the bookshelf arrangement guide screen that displays information on which the user has read the book corresponding to each of the book objects, the complete read rate, and the number of read times.

The digital twin bookshelf providing apparatus 100 outputs the bookshelf arrangement guide screen. The digital twin bookshelf providing apparatus 100 may set the transparency of the bookshelf arrangement guide screen, and then output the bookshelf arrangement guide screen such that the bookshelf arrangement guide screen overlaps the real bookshelf image. When outputting the bookshelf arrangement guide screen to overlap the real bookshelf image, the digital twin bookshelf providing apparatus 100 may separately display different portions.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. An apparatus for providing a digital twin bookshelf, comprising:
   a camera configured to generate a real bookshelf image by capturing an image of a real bookshelf in which real books are arranged;
   a display;
   a processor; and
   a memory configured to store instructions which, when executed, cause the processor to perform operations,
   wherein the processor performs an image processing operation on the real bookshelf image, generates book recognition information including at least one of an image and a text by the image processing operation, downloads book information on a book corresponding to the book recognition information, generates a digital twin bookshelf based on the book information and the real bookshelf image, and outputs a bookshelf output request for outputting the digital twin bookshelf, and
   wherein the display outputs the digital twin bookshelf in response to the bookshelf output request,
   wherein the processor determines a bookshelf size and book locations by image processing on the real bookshelf image, generates a virtual bookshelf based on the bookshelf size, generates book objects based on book sizes of the book information, and generates a digital twin bookshelf by arranging the book objects in the virtual bookshelf based on the book locations.

2. The apparatus of claim 1, wherein the processor identifies a book spine of each of real books by image processing of the real bookshelf image, and generates the book recognition information including one or more of a spine letter, a book title, a publisher and a set name, which are printed on the book spine of each of the real books, through a character recognition operation on an image of the book spine.

3. The apparatus of claim 1, wherein the processor downloads book identification information including one or more of a book title, a publisher, a set name and a book spine image, which are associated with a book identifier of a real book, determines the book identifier corresponding to the book recognition information from the book identification information, and downloads book information associated with the book identifier.

4. The apparatus of claim 3, wherein the processor downloads book information including one or more of a book title, a book size, an electronic book, a field and a publishing date, which are associated with the book identifier.

5. The apparatus of claim 1, the memory includes a book information storage place,
   wherein the memory stores book information, included in the book information storage request, in the book information storage place in response to the book information storage request.

6. The apparatus of claim 1,
   wherein the memory stores user information including one or more of the age of a user, the interest field of the user, the number of read times for each book, and a read state for each book, and wherein the processor selects a recommended book among book objects included in the digital twin bookshelf based on the user information, and output a recommended book output request including information on the recommend book, wherein the display outputs the recommended book on the digital twin bookshelf in response to the recommended book output request.

7. The apparatus of claim 1, wherein the processor generates a bookshelf arrangement guide screen represents book objects arranged in the digital twin bookshelf are rearranged, based on the book information and the user information.

8. The apparatus of claim 7, wherein the processor outputs an output request including the bookshelf arrangement guide screen, wherein the display outputs the bookshelf arrangement guide screen to overlap the screen on which the real bookshelf image generated by the camera is outputted.

9. A method for providing a digital twin bookshelf using an apparatus for providing a digital twin bookshelf, comprising:

generating a real bookshelf image by capturing an image of a real bookshelf in which real books are arranged;

performing an image processing operation on the real bookshelf image;

generating book recognition information including at least one of an image and a text by the image processing operation;

downloading book information on a book corresponding to the book recognition information detected in the detecting of the book recognition information;

generating a digital twin bookshelf based on the book information and the real bookshelf image; and outputting the digital twin bookshelf generated in the generating of the digital twin bookshelf, wherein the generating of the digital twin bookshelf comprises:

determining a bookshelf size and book locations by image processing on the real bookshelf image;

generating book objects corresponding to the real books, based on book sizes of the book information;

generating a virtual bookshelf based on the bookshelf size; and generating a digital twin bookshelf by arranging the book objects in the virtual bookshelf based on the book locations.

10. The method of claim 9, wherein the generating the book recognition information comprises:

identifying a book spine of each of the real books by image processing of the real bookshelf image; and generating book recognition information including one or more of a spine letter, a book title, a publisher and a set name, which are printed on each of the book spines of the real books, through a character recognition operation on an image of the book spine image detected in the detecting of the book spine image.

11. The method of claim 9, wherein the downloading of the book information comprises:

downloading book identification information including at least one of a book title, a publisher, a set name and a book spine image, which are associated with a book identifier of each of the real books;

determining the book identifier corresponding to the book recognition information from the book identification information downloaded in the downloading of the book identification information; and downloading book information associated with the book identifier detected in the detecting of the book identifier.

12. The method of claim 9, wherein the downloading of the book information comprises downloading book information including one or more of a book title, a book size, an electronic book, a field and a publishing date which are associated with the book identifier.

13. The method of claim 9, further comprising:

selecting a recommended book among book objects included in the digital twin bookshelf, based on user information, after the generating of the digital twin bookshelf; and outputting a recommended book onto a screen on which the digital twin bookshelf is outputted, wherein the selecting of the recommended book comprises selecting a recommended book, based on the user information including one or more of the age of a user, the interest field of the user, the number of read times for each book, and a read state for each book.

14. The method of claim 9, further comprising:

generating a bookshelf arrangement guide screen by rearranging the book objects arranged on the digital twin bookshelf, based on the book information and the user information, after the generating of the digital twin bookshelf; and outputting the bookshelf arrangement guide screen generated in the generating of the bookshelf arrangement guide screen.

15. The method of claim 14, wherein the outputting of the bookshelf arrangement guide screen comprises outputting the bookshelf arrangement guide screen to overlap a screen that outputs the real bookshelf image.

* * * * *